United States Patent
Dahman et al.

(10) Patent No.: US 7,469,314 B2
(45) Date of Patent: Dec. 23, 2008

(54) MAGNETIC TAPE WRITE ONCE OVERWRITE PROTECTION

(75) Inventors: Kirby Grant Dahman, Seattle, WA (US); Paul Merrill Greco, Tucson, AZ (US); Glen Alan Jaquette, Tucson, AZ (US); Steven Michael Wallace, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 11/076,643

(22) Filed: Mar. 10, 2005

(65) Prior Publication Data

US 2006/0203373 A1 Sep. 14, 2006

(51) Int. Cl.
*G06F 12/00* (2006.01)

(52) U.S. Cl. .................... 711/111; 360/69; 369/84; 711/163

(58) Field of Classification Search ............. 711/111, 711/112, 4, 163; 369/84, 47.1, 53.21, 53.24; 360/55, 51, 20, 72.1
See application file for complete search history.

(56) References Cited

U.S. PATENT DOCUMENTS

| | | | |
|---|---|---|---|
| 5,446,857 A | 8/1995 | Russ | 395/427 |
| 5,535,188 A | 7/1996 | Dang et al. | 369/84 |
| 5,903,407 A * | 5/1999 | Tsai | 360/72.1 |
| 6,339,810 B1 | 1/2002 | Basham et al. | 711/111 |
| 6,615,330 B2 | 9/2003 | Debiez et al. | 711/163 |
| 6,636,942 B2 | 10/2003 | Greco | 711/112 |
| 6,724,705 B1 * | 4/2004 | Ko et al. | 369/53.21 |
| 7,224,545 B2 * | 5/2007 | Saliba et al. | 360/69 |
| 2002/0035665 A1 | 3/2002 | Basham et al. | 711/112 |
| 2003/0067701 A1 | 4/2003 | Christie, Jr. | 360/60 |
| 2003/0126359 A1 | 7/2003 | Deibez et al. | 711/112 |
| 2003/0126446 A1 | 7/2003 | Debiez et al. | 713/178 |
| 2005/0111325 A1 * | 5/2005 | Ko et al. | 369/53.21 |
| 2005/0235103 A1 * | 10/2005 | Saliba et al. | 711/111 |

* cited by examiner

*Primary Examiner*—Pierre-Michel Bataille
(74) *Attorney, Agent, or Firm*—John H. Holcombe

(57) ABSTRACT

A magnetic tape cartridge, a recording system, and a magnetic tape drive are configured to, for example, guard against tampering with a write once overwrite protection pointer which allows a rewritable magnetic tape to be treated as write once. In one embodiment, the magnetic tape cartridge comprises a magnetic tape and a cartridge memory. The magnetic tape is configured to provide at least one overwrite protection pointer, the overwrite protection pointer identifying data to be protected from being overwritten; and the cartridge memory is configured to provide the at least one overwrite protection pointer, the overwrite protection pointer identifying magnetic tape data to be protected from being overwritten.

26 Claims, 3 Drawing Sheets

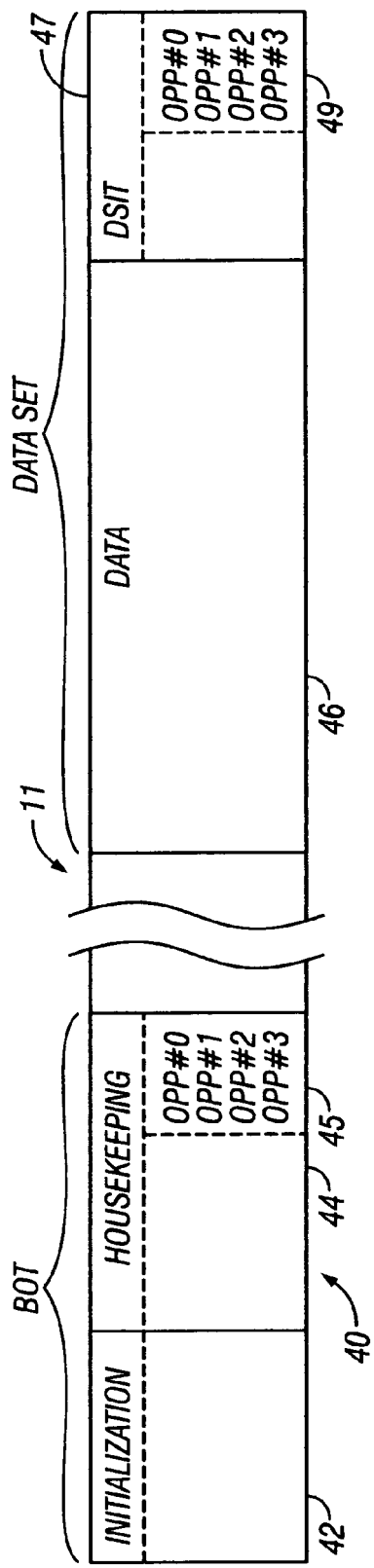
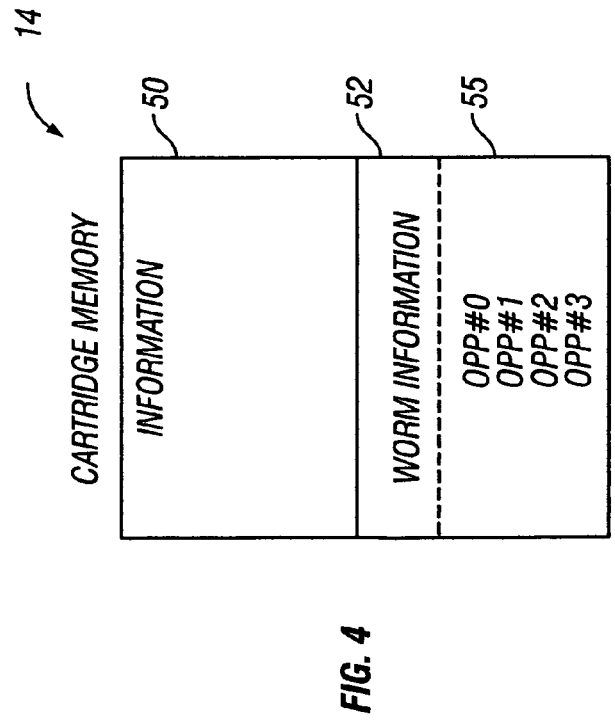
FIG. 3
FIG. 4

MAGNETIC TAPE WRITE ONCE OVERWRITE PROTECTION

FIELD OF THE INVENTION

This invention relates to the utilization of rewritable magnetic tape as write once media, for example, known as write-once-read-many ("WORM") media.

BACKGROUND OF THE INVENTION

Magnetic tape is typically a rewritable recording media, but may be rendered as write once media by limiting overwrite of the media. For example, copending and coassigned U.S. Pat. No. 6,339,810, Basham et al., discusses treating data storage media as WORM by automatically advancing a write append limiter as data is written, and preventing changes to data occurring before the write append limiter.

SUMMARY OF THE INVENTION

In one embodiment, a magnetic tape cartridge is configured to guard against tampering with a write once overwrite protection pointer. The magnetic tape cartridge comprises a magnetic tape and a cartridge memory. The magnetic tape provides at least one overwrite protection pointer, the overwrite protection pointer identifying data to be protected from being overwritten; and the cartridge memory provides the at least one overwrite protection pointer. The overwrite protection pointer identifying magnetic tape data to be protected from being overwritten.

In another embodiment, a recording system for magnetic tape. The magnetic tape mounted with respect to a magnetic tape cartridge having a cartridge memory, comprises logic configured to record at least one overwrite protection pointer on the magnetic tape, the overwrite protection pointer identifying data to be protected from being overwritten; and logic configured to provide the overwrite protection pointer to the cartridge memory, the overwrite protection pointer identifying magnetic tape data to be protected from being overwritten.

In another embodiment, a magnetic tape drive is configured to read and write information with respect to a magnetic tape mounted with respect to a magnetic tape cartridge having a cartridge memory. The magnetic tape drive comprises at least one motor configured to move the magnetic tape longitudinally; at least one read/write head configured to read from and to write to the magnetic tape while the magnetic tape is moved longitudinally by the motor(s); at least one recording channel configured to operate the read/write head(s) to read from and to write to the magnetic tape; a memory interface configured to communicate with respect to the cartridge memory; and at least one control system configured to operate the at least one recording channel to record at least one overwrite protection pointer on the magnetic tape, the overwrite protection pointer identifying data to be protected from being overwritten; and configured to operate the memory interface to provide the at least one overwrite protection pointer to the cartridge memory, the overwrite protection pointer identifying magnetic tape data to be protected from being overwritten.

In a further embodiment, the magnetic tape overwrite protection pointer and the cartridge memory overwrite protection pointer, comprises a plurality of updateable overwrite protection pointers, the overwrite protection pointers configured to be updated in a sequence.

For a fuller understanding of the present invention, reference should be made to the following detailed description taken in conjunction with the accompanying drawings.

BRIEF DESCRIPTION OF THE DRAWINGS

FIG. 3 is a diagrammatic representation of information provided on a magnetic tape, comprising beginning of tape information and a data set;

FIG. 4 is a diagrammatic representation of information provided in a cartridge memory, including WORM information;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
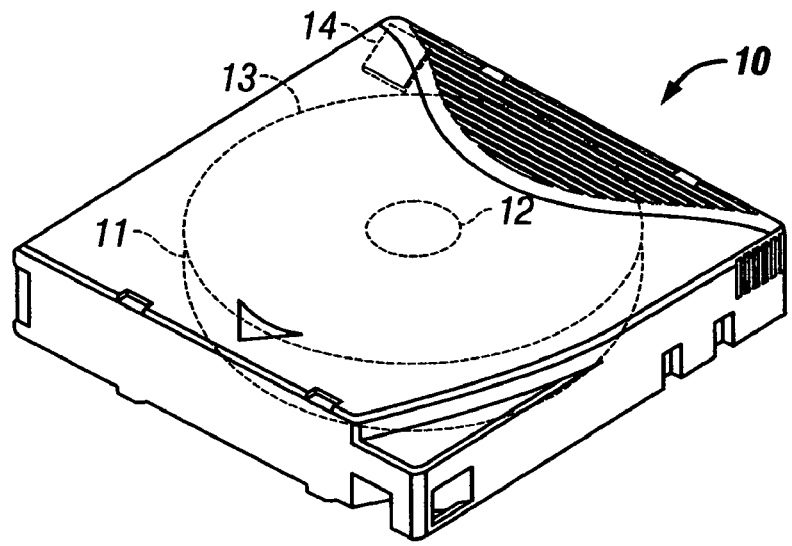
FIG. 1 is an isometric view of a magnetic tape cartridge with a magnetic tape and a cartridge memory shown in phantom.

Referring to FIG. 1, an example of a magnetic tape cartridge 10 in which the present invention may be employed is illustrated which comprises a rewritable magnetic tape 11 wound on a hub 12 of reel 13, and a cartridge memory 14. One example of a magnetic tape cartridge comprises a cartridge based on LTO (Linear Tape Open) technology. The cartridge memory 14, for example, comprises a transponder having a contactless interface, which is retained in the cartridge 10, for example, by being encapsulated by the cartridge when it is assembled, as is understood by those of skill in the art. The illustrated magnetic tape cartridge is a single reel cartridge. Magnetic tape cartridges may also comprise dual reel cartridges in which the tape is fed between reels of the cartridge.

Figure 2:
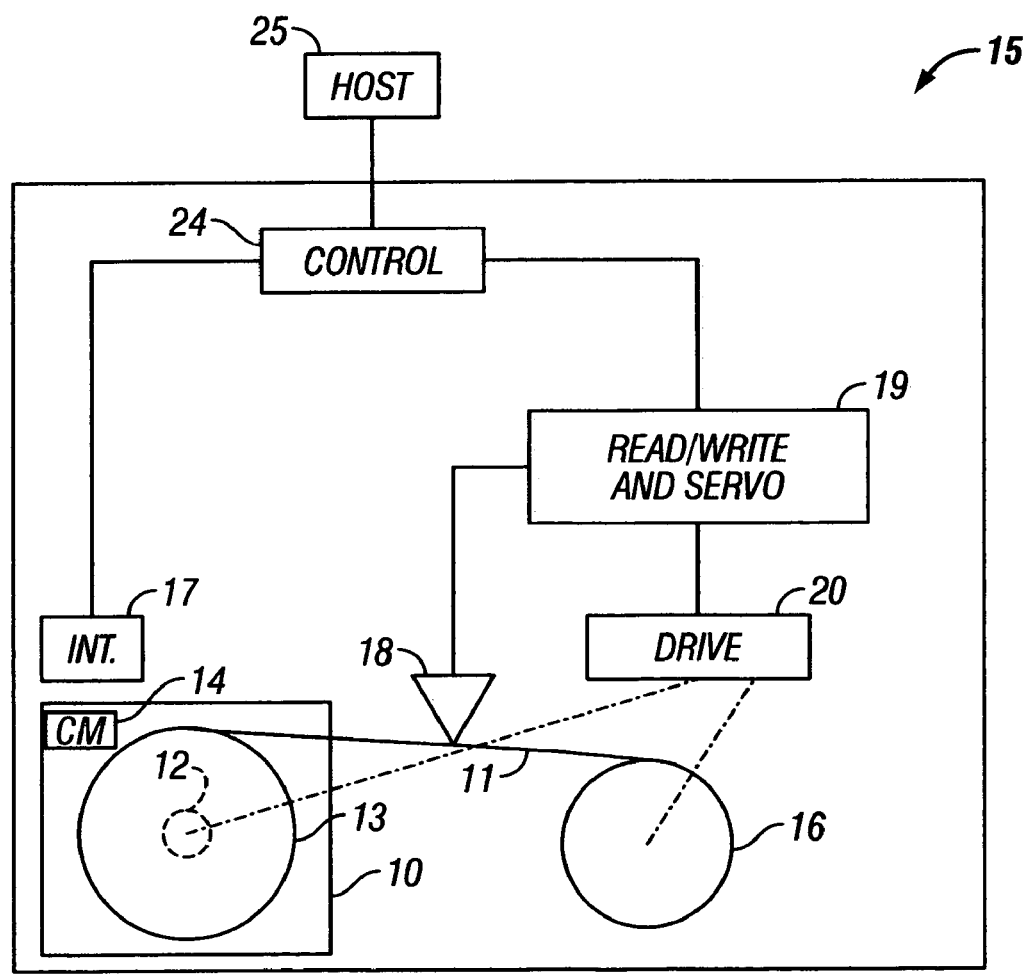
FIG. 2 is a block diagrammatic representation of a magnetic tape drive for handling the magnetic tape cartridge of FIG. 1.

Referring to FIG. 2, a magnetic tape drive 15 is illustrated. One example of a magnetic tape drive in which the present invention may be employed is the IBM 3580 Ultrium magnetic tape drive based on LTO technology, with microcode, etc., to perform desired operations with respect to the magnetic tape cartridge 10. In the instant example, the magnetic tape 11 is wound on a reel 13 in the cartridge 10, and, when loaded in the magnetic tape drive 15, is fed between the cartridge reel and a take up reel 16 in the magnetic tape drive. Alternatively, both reels of a dual reel cartridge are driven to feed the magnetic tape between the reels.

The magnetic tape drive comprises a memory interface 17 for reading information from, and writing information to, the cartridge memory 14 of the magnetic tape cartridge 10, for example, in a contactless manner. A read/write system is provided for reading and writing information to the magnetic tape, and, for example, may comprise a read/write and servo head system 18 with a servo system for moving the head laterally of the magnetic tape 11, a read/write servo control 19, and a drive motor system 20 which moves the magnetic tape 11 between the cartridge reel 13 and the take up reel 16 and across the read/write and servo head system 18. The read/write and servo control 19 controls the operation of the drive motor system 20 to move the magnetic tape 11 across the read/write and servo head system 18 at a desired velocity, and, in one example, determines the location of the read/write and servo head system with respect to the magnetic tape 11. In one example, the read/write and servo head system 18 and read/write and servo control 19 employ servo signals on the magnetic tape 11 to determine the location of the read/write and servo head system, and in another example, the read/write and servo control 19 employs at least one of the reels, such as by means of a tachometer, to determine the location of the read/write and servo head system with respect to the magnetic tape 11. The read/write and servo head system 18 and read/write and servo control 19 may comprise hardware elements and may comprise any suitable form of logic, including a processor operated by software, or microcode, or firmware, or may comprise hardware logic, or a combination.

A control system 24 communicates with the memory interface 17, and communicates with the read/write system, e.g., at read/write and servo control 19. The control system 24 may comprise any suitable form of logic, including a processor operated by software, or microcode, or firmware, or may comprise hardware logic, or a combination.

The illustrated and alternative embodiments of magnetic tape drives are known to those of skill in the art, including those which employ dual reel cartridges.

The control system 24 typically communicates with one or more host systems 25, and operates the magnetic tape drive 15 in accordance with commands originating at a host. Alternatively, the magnetic tape drive 15 may form part of a subsystem, such as a library, and may also receive and respond to commands from the subsystem.

As illustrated, the magnetic tape drive 15 provides information to the cartridge memory 14 of the magnetic tape cartridge 10, and provides information to the magnetic tape 11 of the magnetic tape cartridge 10.

Referring to FIG. 3, a magnetic tape 11 may be organized in many ways. Typically, a magnetic tape is arranged with parallel tracks, and may also be arranged with several parallel wraps of groups of parallel tracks. In one example, the magnetic tape is moved longitudinally in a first direction while the head system reads and/or writes data with respect to one wrap, and is reversed to be moved in the opposite direction and the head system is shifted to another wrap.

In FIG. 3, the information is shown laid out as a single wrap for the purpose of illustration. An area 40 at or near the front end of the magnetic tape 11 is called the "beginning of tape" (BOT) as is known to those of skill in the art. In a single reel magnetic tape cartridge, this is the area of one or more wraps near the front end of the magnetic tape (leader block) that is loaded into the take up reel 16 of the magnetic tape drive 15 as depicted in FIG. 2. In a dual reel magnetic tape cartridge, an area of the magnetic tape near the center, about halfway between one reel and the other, is typically designated the BOT, and may comprise one or more wraps. Such a dual reel magnetic tape cartridge is also referred to as a midpoint load tape.

Referring to FIG. 3, in one embodiment, the magnetic tape cartridge is configured to provide, among the information of the BOT, such as initialization information 42 and housekeeping information 44, one or more write once overwrite protection pointers 45 which identify data to be protected from being overwritten, and thereby allow a rewritable magnetic tape to be treated as write once.

Also, a magnetic tape typically records data in the form of "data sets" 46 or similar arrangements of data. In one example, each complete data set is accompanied by a "data set information table" 47 which provides information about the data set 46. In one embodiment, each data set information table 47 provides at least one write once overwrite protection pointer 49 which identifies data to be protected from being overwritten, and thereby allows a rewritable magnetic tape to be treated as write once. The write once overwrite protection pointers 49 may comprise an addition to or an alternative to the write once overwrite protection pointers 45 at the BOT.

Referring to FIG. 4, an example of the content of the cartridge memory 14 of the magnetic tape cartridge 10 of FIGS. 1 and 2 is illustrated. One example of a cartridge memory 14 and its content is described in Standard ECMA-319, June 2001, "Data Interchange on 12, 7 mm 384-Track Magnetic Tape Cartridges—Ultrium-1 Format", Annex D—LTO Cartridge Memory, pp. 95-115. As one example, the cartridge memory 14 is arranged in areas of various sizes with information organized into "pages". The cartridge memory 14 may be similar to the memory and transponder used in "smart cards" as are known to those of skill in the art. Those of skill in the art may envision additional types of cartridge memories.

Referring to FIG. 4, in one embodiment, information 50 about the magnetic tape cartridge is provided, in addition to WORM information 52. The WORM information may, for example, indicate a level of WORM protection, any read protection limiting access to the data to be read, etc., and at least one write once overwrite protection pointer 55 which identifies data to be protected from being overwritten, and which thereby allows a rewritable magnetic tape to be treated as write once.

Figure 5:
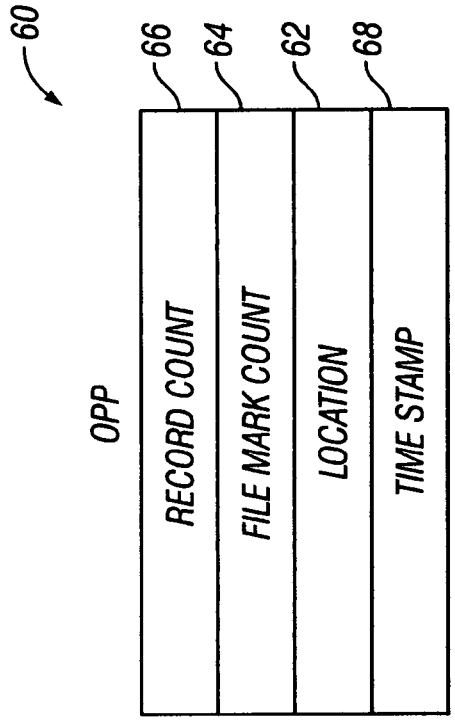
FIG. 5 is a diagrammatic representation of information related to an overwrite protection pointer.

FIG. 5 illustrates an embodiment of a write once overwrite protection pointer 60 (OPP) which may comprise a magnetic tape overwrite protection pointer 45 at the BOT of FIG. 3, may comprise a magnetic tape overwrite protection pointer 49 in a DSIT of FIG. 3, or may comprise a cartridge memory overwrite protection pointer 55 of FIG. 4.

Referring to FIG. 5, an overwrite protection pointer 60 identifies a location 62. As an example, the identified location may comprise the wrap and the offset from a starting point, such as the number of servo timing or longitudinal distance marks from a starting point. Still alternatively, the location may be identified by means of a count of the number 64 of filemarks recorded to the magnetic tape from the BOT to the identified location. Alternatively, or additionally, the location may be identified by means of a count of the number 66 of the records recorded to the magnetic tape from the BOT to the identified location. The location identified by an overwrite protection pointer is the location before which is protected from being overwritten.

If a plurality of overwrite protection pointers 60 are provided, a timestamp 68 may be provided to identify the current valid overwrite protection pointer. The timestamp may or may not be a direct part of the overwrite protection pointer, but is associated with the pointer.

Referring to FIGS. 1, 2, 3, 4 and 5, in accordance with an embodiment of the present invention, a magnetic tape cartridge 10, a recording system 24, 19, 18, and a magnetic tape drive 15 are configured to, for example, guard against tampering with a write once overwrite protection pointer which allows a rewritable magnetic tape to be treated as write once. The magnetic tape 11 is configured to provide at least one overwrite protection pointer 45, 49, the overwrite protection pointer identifying data to be protected from being overwritten; and the cartridge memory 14 is configured to provide the at least one overwrite protection pointer 55, the overwrite protection pointer identifying magnetic tape data to be protected from being overwritten. In these embodiments, the presence of the overwrite protection pointer in both the magnetic tape 11 and the cartridge memory 14 guards against tampering.

Alternatively, or additionally, the presence of the overwrite protection pointers 45, 49 at two separate areas of the magnetic tape 11 guards against tampering.

Referring to FIGS. 3 and 4, in another embodiment of the present invention, the magnetic tape overwrite protection pointer 45 and/or 49, and/or the cartridge memory overwrite protection pointer 55, comprises a plurality of updateable overwrite protection pointers, the overwrite protection pointers configured to be updated in a sequence. In one example, the sequence is in a circular order, e.g. OPP#0, OPP#1, OPP#2, OPP#3, OPP#0, . . . In one example, the sequentially updated overwrite protection pointers preserve the lifecycle of a cartridge memory.

In an alternative embodiment, a plurality of updateable magnetic tape overwrite protection pointers 45 and/or 49 may be updated in a sequence (with or without overwrite protection pointers in the cartridge memory); and in a further alternative embodiment, a plurality of updateable cartridge memory overwrite protection pointers 55 may be updated in a sequence (with or without magnetic tape overwrite protection pointers).

Referring to FIG. 5, in further embodiments, the magnetic tape and/or the cartridge memory updateable overwrite protection pointers 60 are configured to be time-stamped 68 when updated, to identify the current valid overwrite protection pointer, as discussed above. The time stamp may be an indication of the number of times that the magnetic tape cartridge has been loaded to a magnetic tape drive, or may be a clock time of a subsystem in which the magnetic tape drive is located, for example, a library.

Alternatively, the overwrite protection pointers 60 may be arranged in a sequence, for example, of an ever increasing location value, in that no previously protected area is later "unprotected". As the result, the newest OPP is always an increased value, and the highest value is by nature the latest. In this sense, the location value of the OPP may be considered the equivalent of "timestamp".

Alternatively, referring to FIG. 5, the count of the number 64 of filemarks recorded to the magnetic tape from the BOT to the identified location, and/or the count of the number 66 of the records recorded to the magnetic tape from the BOT to the identified location may comprise timestamps. Those of skill in the art can envision additional time stamp embodiments.

In still further embodiments, additionally or alternatively, the magnetic tape and/or the cartridge memory updateable overwrite protection pointers are configured to duplicate the current valid overwrite protection pointer to identify the current valid overwrite protection pointer. Referring to FIGS. 3 and 4, the current valid overwrite protection pointer may comprise OPP#1, and be designated as the current valid overwrite protection pointer by having the pointer duplicated as OPP#2. The duplication may be accomplished upon receipt of an unload request by the magnetic tape drive 15 of FIG. 2. As an example, if OPP#1 is written after a string of user data is written, and then an unload request is received, the contents of OPP#1 is copied to OPP#2.

When a new cartridge is loaded, the magnetic tape drive 15 recording system 24, 19, 18 of FIG. 2 determines the latest overwrite protection pointer by means of the timestamps as discussed above. It should have the latest timestamp or be tied with the latest timestamp. The second copy is verified as well. The second copy is then overwritten when the first OPP update occurs on the new load. In the above example, the first update would be to OPP#2, because it is the second copy of the previous final OPP.

If a duplicate OPP is not found which matches the OPP with the latest timestamp, then another set of the OPP's is consulted to provide OPP integrity. For example, referring to FIGS. 3 and 4, if OPP#2 does not agree with OPP#1 of the OPP's 45 in the BOT, then OPP#1 and OPP#2 of the OPP's 55 of the cartridge memory are consulted. In another example, if OPP#2 does not agree with OPP#1 of the OPP's 45 in the BOT, then OPP#1 and OPP#2 of the OPP's 49 of the DSIT at the expected end of data (EOD) are consulted.

Integrity of the overwrite protection pointer may be provided by arranging the overwrite protection pointers in a sequence, for example, of an ever increasing value, as discussed above. Thus, the highest location value OPP is by nature the latest.

Additional integrity checks may be made to insure that an OPP is always greater or equal to any logically preceding OPP's, and existing OPP's, for example, in the DSIT's, are less than or equal to "current" OPP's from the cartridge memory. As such, the OPP integrity is maintained in the absence of, or in addition to, timestamps.

Thus, in a further embodiment of the present invention, the overwrite protection pointers are read and compared to check for validity and, if validity is not insured, i.e. the cartridge memory and tape OPP's do not match, there is no duplicate OPP or the last OPP does not have the latest timestamp or does not have the greatest value, then the cartridge will be treated as lacking OPP integrity. For example, the tape could be treated as read only, or treated as a "tampered" tape and disallowed from all read and/or write processing. Alternatively, data could be appended only at the logical end of tape. The selection of these or other options may be arbitrary or based on information found by the various OPP methods.

Referring to FIGS. 2, 3, 4 and 5, control 24, in one embodiment, is configured to operate the recording channel 18, 19 to read at least one OPP from magnetic tape 11, and to operate the memory interface 17 to read at least one OPP from cartridge memory 14. In another embodiment, a plurality of overwrite protection pointers are read from the magnetic tape 11. The logic then determines from the read overwrite protection pointers, e.g. by comparing at least two of the read OPP's, the validity of the OPP's.

Another method of assuring integrity of the overwrite protection pointers is to interlock the OPP's with "good status" which is returned to the application which wrote the record or File Mark which caused the OPP to be advanced.

In an additional embodiment of the present invention, the sequence of updating the overwrite protection pointers may be to update the pointers 49 of the DSIT of the last data set written when an unload command is received by the magnetic tape drive, called the end of data (EOD) data set, the pointers 55 of the cartridge memory are then updated, and, lastly, the contents of the cartridge memory WORM information is copied to the housekeeping section of the BOT, thereby providing the updated pointers 45.

In a further embodiment of the present invention, the overwrite protection pointers may identify locations that are at the end of completed data that has been written, in order to allow an application to overwrite incomplete constructs and change or update labels, such as to update or invalidate information.

In another embodiment of the present invention, the overwrite protection pointers may identify locations that are at the end of data, prior to the end of file or similar constructs, to allow an application to append data to what had been an end of data or end of file.

Figure 6:
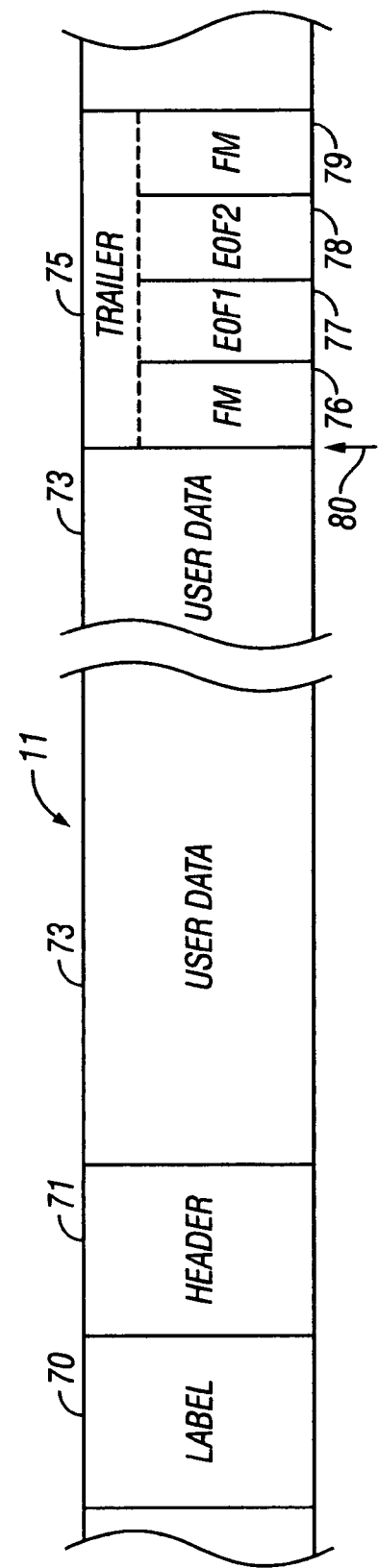
FIG. 6 is a diagrammatic representation of information related to a data file provided on a magnetic tape.

Referring to FIG. 6, the information is shown laid out as a single wrap of magnetic tape 11 for the purpose of illustration. Typical constructs include a label 70 at a beginning of a partition, and header 71 at the beginning, for example, of a file, followed by user data 73. A trailer 75, such as at the end of a user file, may indicate the end of a file and, for example, comprise a filemark 76, a first end of file indicator 77, a second end of file indicator 78, and another filemark 79.

In the example of FIG. 6, the overwrite protection pointer 60 of FIG. 5 thus is configured to identify the location 80 of FIG. 6, at the end of the user data 73 and prior to the end of file constructs of trailer 75. Similarly, the OPP does not identify a header 71, but rather is moved with the data. Those of skill in the art will envision similar locations in similar constructs.

Thus, the application can go back and forth and change candidate constructs and the OPP will identify the data after it is completely and finally written by the application. For example, the DSIT having the updated OPP (or OPP's) will be the end of data (EOD) data set.

Those of skill in the art will understand that changes may be made with respect to the number or content of the OPP's and to their locations. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic tape cartridge comprising:
   a magnetic tape configured to provide at least one overwrite protection pointer, said overwrite protection pointer identifying data to be protected from being overwritten; and
   a cartridge memory configured to provide said at least one overwrite protection pointer, said overwrite protection pointer identifying magnetic tape data to be protected from being overwritten.

2. The magnetic tape cartridge of claim 1, wherein said magnetic tape at least one overwrite protection pointer and said cartridge memory at least one overwrite protection pointer, comprises a plurality of updateable overwrite protection pointers, said overwrite protection pointers configured to be updated in a sequence.

3. The magnetic tape cartridge of claim 2, wherein said magnetic tape and said cartridge memory updateable overwrite protection pointers are configured to be time-stamped when updated, to identify the current valid overwrite protection pointer.

4. The magnetic tape cartridge of claim 2, wherein said magnetic tape and said cartridge memory updateable overwrite protection pointers are configured to duplicate the current valid overwrite protection pointer to identify the current valid overwrite protection pointer.

5. The magnetic tape cartridge of claim 1, wherein said magnetic tape at least one overwrite protection pointer and said cartridge memory at least one overwrite protection pointer are configured to identify the end of data that is to be protected from being overwritten, prior to end of file constructs.

6. The magnetic tape cartridge of claim 1, wherein said magnetic tape is configured to provide said at least one overwrite protection pointer as at least a part of "beginning of tape" information.

7. The magnetic tape cartridge of claim 1, wherein said magnetic tape is configured to provide said at least one overwrite protection pointer as at least a part of "data set information table".

8. The magnetic tape cartridge of claim 1, wherein said magnetic tape is configured to provide a copy of said at least one cartridge memory overwrite protection pointer to a "housekeeping data set" of said magnetic tape.

9. A recording system for magnetic tape, said magnetic tape mounted with respect to a magnetic tape cartridge having a cartridge memory, comprising:
   logic configured to record at least one overwrite protection pointer on said magnetic tape, said overwrite protection pointer identifying data to be protected from being overwritten; and
   logic configured to provide said at least one overwrite protection pointer to said cartridge memory. said overwrite protection pointer identifying magnetic tape data to be protected from being overwritten.

10. The recording system of claim 9, wherein:
    said logic configured to record at least one overwrite protection pointer on said magnetic tape and said logic configured to provide said at least one overwrite protection pointer to said cartridge memory, are configured to provide a plurality of updateable overwrite protection pointers, said overwrite protection pointers configured to be updated in a sequence.

11. The recording system of claim 10, wherein:
    said logic configured to record at least one overwrite protection pointer on said magnetic tape and said logic configured to provide said at least one overwrite protection pointer to said cartridge memory, are configured to time-stamp said magnetic tape and said cartridge memory updateable overwrite protection pointers when updated, to identify the current valid overwrite protection pointer.

12. The recording system of claim 10, wherein:
    said logic configured to record at least one overwrite protection pointer on said magnetic tape and said logic configured to provide said at least one overwrite protection pointer to said cartridge memory, are configured to duplicate the current valid said magnetic tape and said cartridge memory updateable overwrite protection pointers, to identify the current valid overwrite protection pointer.

13. The recording system of claim 9, wherein:
    said logic configured to record at least one overwrite protection pointer on said magnetic tape and said logic configured to provide said at least one overwrite protection pointer to said cartridge memory, are configured to provide said overwrite protection pointers, identifying the end of data that is to be protected from being overwritten, prior to end of file constructs.

14. The recording system of claim 9, wherein said logic configured to record at least one overwrite protection pointer on said magnetic tape is configured to provide said at least one overwrite protection pointer as at least a part of "beginning of tape" information.

15. The recording system of claim 9, wherein said logic configured to record at least one overwrite protection pointer on said magnetic tape is configured to provide said at least one overwrite protection pointer as at least a part of "data set information table".

16. The recording system of claim 9, additionally comprising:

logic configured to provide a copy of said at least one cartridge memory overwrite protection pointer to a "housekeeping data set" of said magnetic tape.

17. A magnetic tape drive configured to read and write information with respect to a magnetic rape, said magnetic tape mounted with respect to a magnetic tape cartridge having a cartridge memory, comprising:
at least one motor configured to move said magnetic tape longitudinally;
at least one read/write, head configured to read from and to write to said magnetic tape while said magnetic tape is moved longitudinally by said at least one motor;
at least one recording channel configured to operate said at least one read/write head to read from and to write to said magnetic tape;
a memory interface configured to communicate with respect to said cartridge memory; and
at least one control system configured to operate said at least one recording channel to record at least one overwrite protection pointer on said magnetic tape, said overwrite protection pointer identifying data to be protected from being overwritten; and configured to operate said memory interface to provide said at least one overwrite protection pointer to said cartridge memory, said overwrite protection pointer identifying magnetic tape data to be protected from being overwritten.

18. The magnetic tape drive of claim 17, wherein:
said at least one control system is configured to provide a plurality of said magnetic tape and said cartridge memory updateable overwrite protection pointers, said overwrite protection pointers configured to be updated in a sequence.

19. The magnetic tape drive of claim 18, wherein:
said at least one control system is configured to time-stamp said magnetic tape and said cartridge memory updateable overwrite protection pointers when updated, to identify the current valid overwrite protection pointer.

20. The magnetic tape drive of claim 18, wherein:
said at least one control system is configured to duplicate the current valid said magnetic tape and said cartridge memory updateable overwrite protection pointers, to identify the current valid overwrite protection pointer.

21. The magnetic tape drive of claim 17, wherein:
said at least one control system is configured to provide said overwrite protection pointers, identifying the end of data that is to be protected from being overwritten, prior to end of file constructs.

22. The magnetic tape drive of claim 17, wherein said at least one control system is configured to provide said at least one overwrite protection pointer for said magnetic tape as at least a part of "beginning of tape" information.

23. The magnetic tape drive of claim 17, wherein said at least one control system is configured to provide said at least one overwrite protection pointer as at least a part of "data set information table".

24. The magnetic tape drive of claim 17, wherein said at least one control system is configured to provide a copy of said at least one cartridge memory overwrite protection pointer to a "housekeeping data set" of said magnetic tape.

25. A recording system for magnetic tape, said magnetic tape mounted with respect to a magnetic tape cartridge, comprising:
logic configured to compare a plurality of overwrite protection pointers of said magnetic tape cartridge, at least one said overwrite protection pointer read from said magnetic tape; and
logic configured to determine from said comparison the validity of said overwrite protection pointers, wherein said magnetic tape cartridge comprises a cartridge memory; and
said logic configured to compare, is configured to compare at least one said overwrite protection pointer read from said magnetic tape and at least one said overwrite protection pointer read from said cartridge memory.

26. A magnetic tape drive configured to read and write information with respect to a magnetic tape, said magnetic tape mounted with respect to a magnetic tape cartridge having a cartridge memory, comprising:
at least one motor configured to move said magnetic tape longitudinally;
at least one read/write head configured to read from and to write to said magnetic tape while said magnetic tape is moved longitudinally by said at least one motor;
at least one recording channel configured to operate said at least one read/write head to read from and to write to said magnetic tape;
a memory interface configured to communicate with respect to said cartridge memory; and
at least one control system configured to operate said at least one recording channel to read at least one overwrite protection pointer recorded on said magnetic tape, said overwrite protection pointer identifying data to be protected from being overwritten; and configured to operate said memory interface to read at least one overwrite protection pointer of said cartridge memory, said overwrite protection pointer identifying magnetic tape data to be protected from being overwritten; and configured to determine from said read overwrite protection pointers, the validity of said overwrite protection pointers.

* * * * *